United States Patent [19]
Suzuki et al.

[11] Patent Number: 5,208,802
[45] Date of Patent: May 4, 1993

[54] DISK ADAPTER FOR DISK CARTRIDGE

[75] Inventors: Akira Suzuki; Yoshikazu Ishimatsu, both of Kanagawa, Japan

[73] Assignee: Sony Corporation, Tokyo, Japan

[21] Appl. No.: 501,728

[22] Filed: Mar. 30, 1990

[30] Foreign Application Priority Data

Apr. 3, 1989 [JP] Japan .......................... 1-039441[U]

[51] Int. Cl.[5] .................... G11B 7/26; G11B 23/03
[52] U.S. Cl. .................................... 369/289; 360/133
[58] Field of Search ............. 369/289, 290, 291, 292, 369/270, 271, 272, 277; 360/133

[56] References Cited

U.S. PATENT DOCUMENTS

| 4,746,013 | 5/1988 | Suzuki et al. | 369/291 X |
| 4,837,784 | 6/1989 | Yamamori | 369/289 |
| 4,899,330 | 2/1990 | Einhaus | 369/289 |

FOREIGN PATENT DOCUMENTS

| 238350 | 9/1987 | European Pat. Off. . | |
| 288900 | 11/1988 | European Pat. Off. . | |
| 0331389 | 9/1989 | European Pat. Off. | 369/290 |
| 8803747 | 6/1988 | Fed. Rep. of Germany . | |
| 0228455 | 9/1988 | Japan | 369/289 |
| 0107388 | 4/1989 | Japan | 369/290 |
| 8402218 | 2/1986 | Netherlands . | |

Primary Examiner—Eugene R. LaRoche
Assistant Examiner—Michael C. Kessell
Attorney, Agent, or Firm—Lewis H. Eslinger; Jay H. Maioli

[57] ABSTRACT

A disk adapter for a disk cartridge is formed to fit in a disk housing section of the disk cartridge. The disk adapter includes an opening at approximately its center for rotatably accommodating a small diameter disk and a positioning element for positioning the disk adapter in the disk housing section of the disk cartridge and to prevent rotation of the adapter in the rotational direction of the accommodated small diameter disk.

4 Claims, 6 Drawing Sheets

DISK ADAPTER FOR DISK CARTRIDGE

BACKGROUND OF THE INVENTION AND RELATED ART STATEMENT

This invention relates to a disk adapter for a disk cartridge wherein disks of different diameters are to be accommodated within the disk cartridge.

There are known in the art recording and/or reproducing apparatus wherein recording and/or reproduction may be made on or from a disk-shaped recording medium, include optical disks dedicated to reproduction, such as a compact disk or a CD-ROM disk, or an optical disk on which information signals may be re-recorded, such as a magneto-optical disk. A disk cartridge accommodating a disk is known for example from the Japanese Utility Model Publication No. JP-A-63-153376(1988) which is provided with a lid that may be opened or closed with respect to the main body to permit the disk to be introduced or a taken out of the main body.

With such conventional disk cartridge, the available spacing for a disk including a disk rest is determined as a function of the diameter of the disk contained in the disk cartridge. Therefore, when a disk of a diameter different than usually employed disk is accommodated, the disk is moved within the disk rest such that, when the disk cartridge is attached to the main body of the recording and/or reproducing apparatus, not only can the disk not be placed on the disk table because the center of the disk table of the recording and/or reproducing apparatus is offset from the center of the disk, but also the disk cannot be chucked correctly, so that the recording and/or reproducing operation becomes unfeasible. When disk chucking is performed in the off center state, the disk area other than the chucking area, such as the signal recording area, is clamped between the chucking plate and the disk table provided in the recording and/or reproducing apparatus, so that the disk surface may be scored giving rise to errors during recording and/or reproduction.

As means for eliminating such deficiency, a disk adapter such as disclosed in the Japanese Patent Publication No. JP-A-64-1174(1989) may be employed. Since the adapter disclosed in this prior-art Publication is designed to hold the peripheral portion of the disk, the above described deficiency may be eliminated by mounting the adapter to the disk and accommodating the adapter-disk assembly in the disk cartridge.

However, since the adapter disclosed in the above Publication is designed simply to hold the outer periphery of the disk, the adapter may naturally be rotated in unison with the disk when the disk-adapter assembly is accommodated in the disk cartridge. However, when the adapter is attached incorrectly or when an impact is applied from outside, the disk may be easily disengaged from the adapter. With the disk thus disengaged from the adapter, there is the risk of the signal recording surface of the disk being scored or the disk being destroyed. There is also the risk of destruction of the disk driving mechanism of the recording and/or reproducing apparatus.

OBJECT AND SUMMARY OF THE INVENTION

It is an object of the present invention to provide a disk adapter for a disk cartridge in which a disk having a diameter less than that of the disk which is usually accommodated in the disk cartridge may be accommodated in the disk cartridge of a predetermined size.

It is another object of the present invention to provide a disk adapter for a disk cartridge in which, even when a disk having a diameter different from that of the disk which is usually accommodated is accommodated in the disk cartridge of a predetermined size, the disk center may be brought into coincidence with the center of rotation of the disk driving apparatus.

The disk adapter for the disk cartridge according to the present invention has an opening at approximately the center thereof for rotatably accommodating a disk-shaped recording medium and an outwardly extending peripheral lug.

With such a disk adapter for the disk cartridge, the disk-shaped recording medium, such as an optical disk, is accommodated in the opening which is formed at substantially the center of the adapter to enable the recording medium to be positioned correctly within the disk cartridge.

The above and other object and advantages of the present invention will become more apparent from the following detailed description thereof which is made in conjunction with the accompanying drawings.

BRIEF DESCRIPTION OF THE DRAWINGS

FIGS. 3 to 6 illustrate the relation between the disk adapter according to the present invention and the disk cartridge to which a disk adapter is applied, with a lid of the disk cartridge being opened, wherein FIG. 3 is a perspective view showing the disk and the adapter before being enclosed in the cartridge, FIG. 4 is a perspective view showing the adapter enclosed in the disk cartridge, FIG. 5 is a perspective view showing the adapter and the disk enclosed in the disk cartridge, and FIG. 6 is a cross-sectional view of FIG. 4.

FIGS. 7 and 8 illustrate the disk cartridge to which the present invention is applied, wherein FIG. 7 is a perspective view showing the lid being opened and FIG. 8 is a perspective view showing the lid from the bottom side, with the shutter being removed.

DETAILED DESCRIPTION OF PREFERRED EMBODIMENTS

Figure 1:
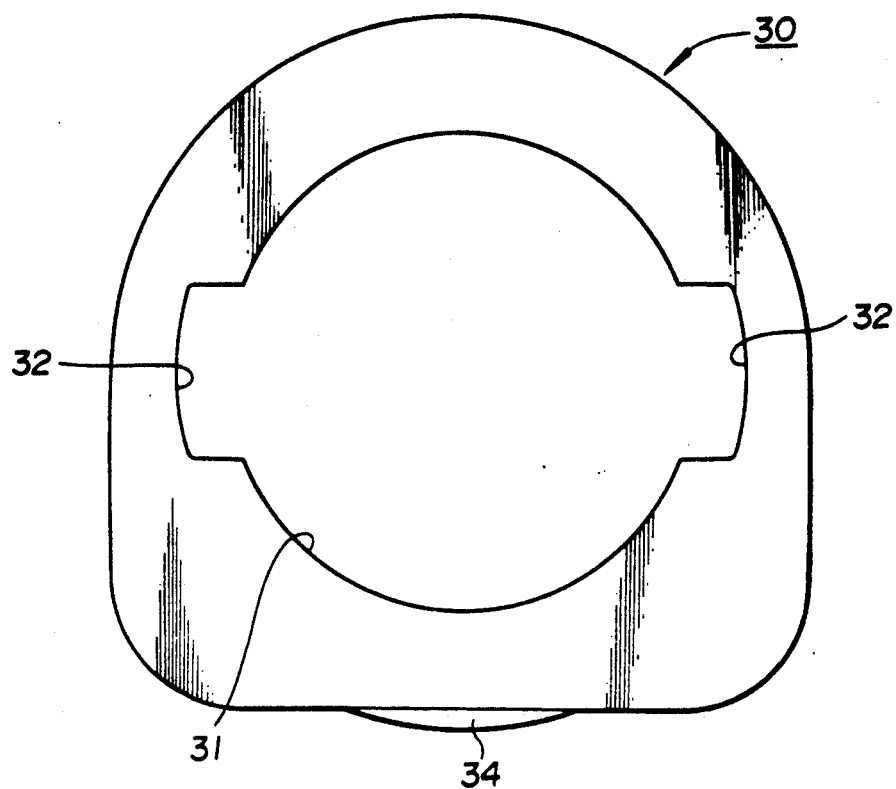
FIG. 1 is a plan view showing a disk adapter for a disk cartridge according to the present invention.

By referring to the drawings, certain preferred embodiment of the present invention will be explained in detail.

Figure 7:
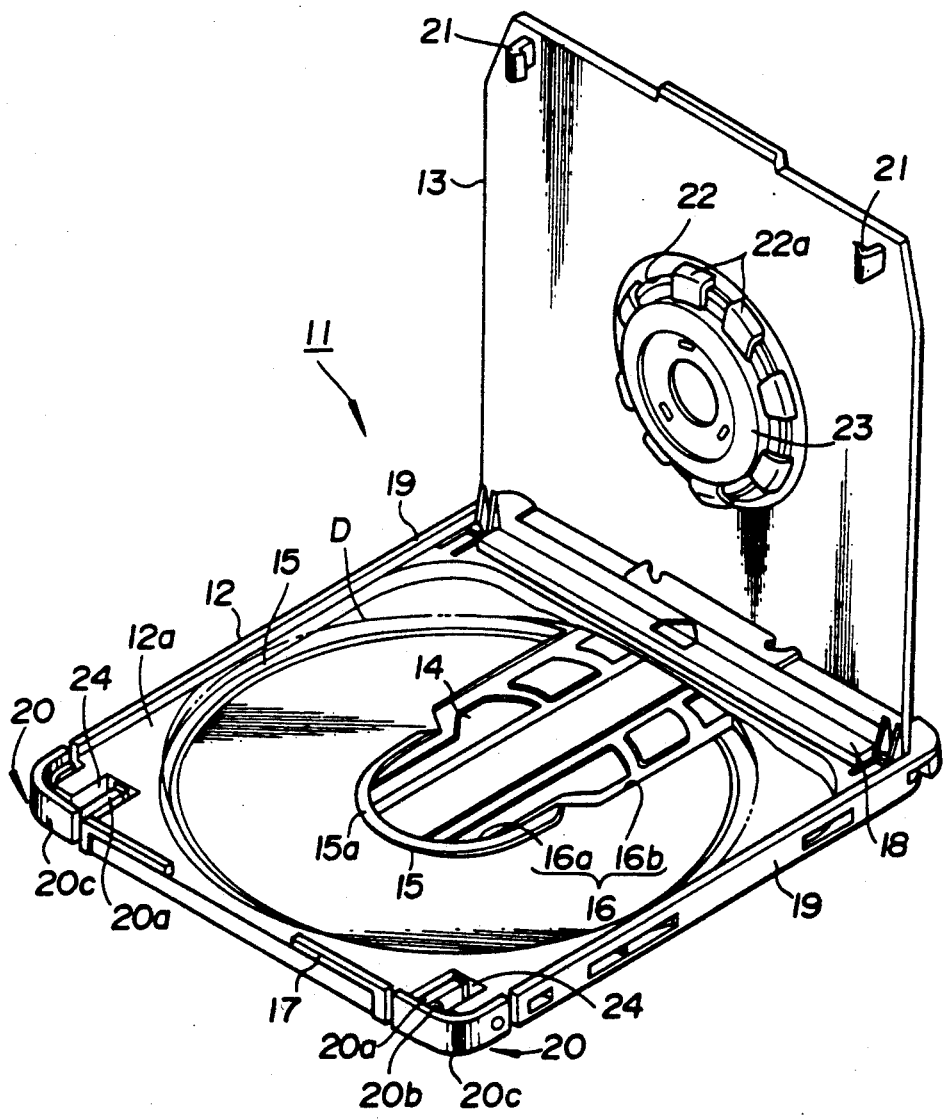
Figure 8:
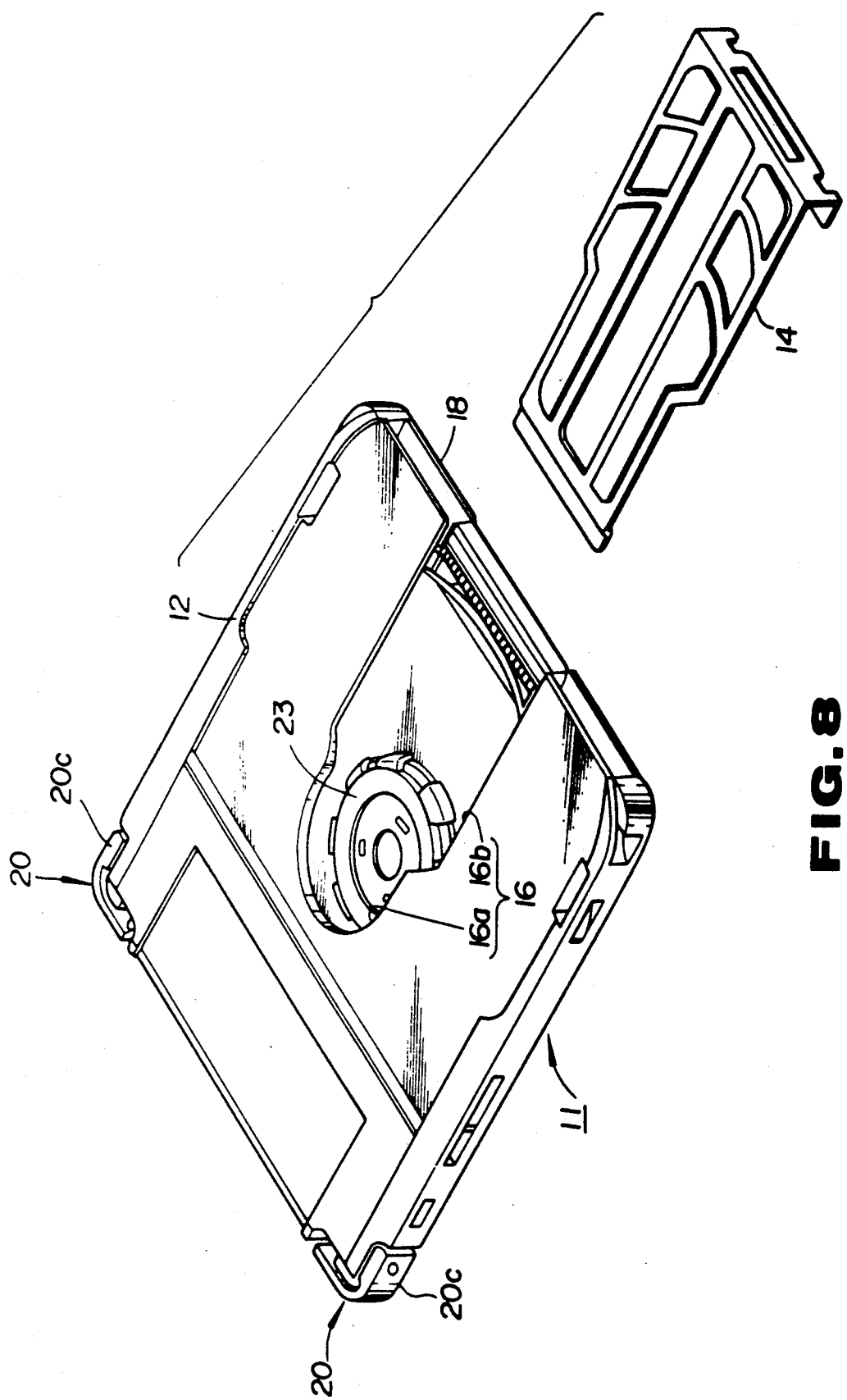

A disk cartridge 11, into and out of which a disk employed advantageously with the present invention is introduced and removed, is explained by referring to FIGS. 7 and 8.

The disk cartridge 11 is comprised of a main body 12 and a lid 13 that may be opened and closed with respect to the main body 12, as shown in FIG. 7, so that the disk can be introduced into or removed from the disk cartridge 11. The main body 12 is molded integrally of synthetic resin in the form of a rectangular plate. At the center of a major surface 12a of the main body 12 is formed a circular disk rest 15 for a disk D, such as an optical disk with a diameter of 12 cm, such as a compact audio disk or a CD-ROM disk. A window opening 16 is formed extending from the center of the disk rest 15 to one side wall of the main body 12. This window opening 16, which is disposed at the center of the disk rest 15, is formed by a circular opening section 16a in register with a disk table provided within the main body of the recording and/or reproducing apparatus when the disk cartridge 11 is mounted within the apparatus, and a rectangular opening section 16b extending from the circular opening section 16a in continuation therewith to one lateral wall of the main body 12 and in register with the trajectory of the radial travel of a recording-/reproducing optical head. This window opening 16 is adapted to be opened and closed by a shutter 14 which is biased in the window opening direction by biasing means, not shown, as shown in FIG. 8 and which is slidably mounted on a peripheral wall 18 of the main body 12.

On the perimeter of the circular opening section 16a is formed a rest edge surface 15a in the form of a rib on which the disk rests when the disk cartridge 11 is in the non-use state.

The lid 13 in the form of a rectangular plate facing the major surface 12a is hingedly connected to the rear peripheral wall 18. This lid 13, molded from synthetic resin, is of a size to fit the inner surfaces of the peripheral walls 17, 18, 19 of the major surface 12a of the main body 12. Engagement hooks 21, 21 are protuberantly formed at inner front corners of the lid 13, while a circular opening 22 is formed in registry with the circular opening section 16a of the window opening 16 of the main body 12 at the center of the lid 13.

As shown in FIG. 7, a chucking plate 23 is loosely fitted within the circular opening 22 and rotatably and pivotally supported by supporting tongues formed at the edge of the opening 22. This chucking plate 23 is adapted to clamp the central portion of the disk D resting on the disk rest 15 of the main body 12 in cooperation with the above mentioned disk table within the recording and/or reproducing apparatus is molded from synthetic resin or the like in the form of a disk having a plate of magnetic metal embedded therein for magnetically chucking the disk by a magnet provided on the disk table.

The main body 12 is provided with locking mechanism 20 for the lid 13 at both forward corners of the major surface 12a of the main body 12. These locking mechanism 20 are comprised of recesses 24 in the vicinity of the forward corners, arm sections 20a extending forward from the rear end faces of the recesses 24 and elastically deformable in the transverse direction, and locking tongues 20b on the forward lateral sides of the arm sections 20a for engagement by the hooks 21 of the lid 13. The locking mechanism 20 are locked in the leveled and closed state of the lid 13 with respect to the main body 12 with the hooks 21 engaged with the locking tongues of the arm sections 20a. In the locked state of the locking mechanism 20, unlocking sections 20c are thrust inwards at lateral sides thereof for elastically deforming and deflecting the arm sections 20a as one with the unlocking sections for disengaging the locking tongues 20b from the hooks 21 of the lid 13 for unlocking the lid 13.

A disk adapter 30 for a disk cartridge according to the present invention, which is applied to the above mentioned disk cartridge 11, is hereinafter explained.

Figure 2:
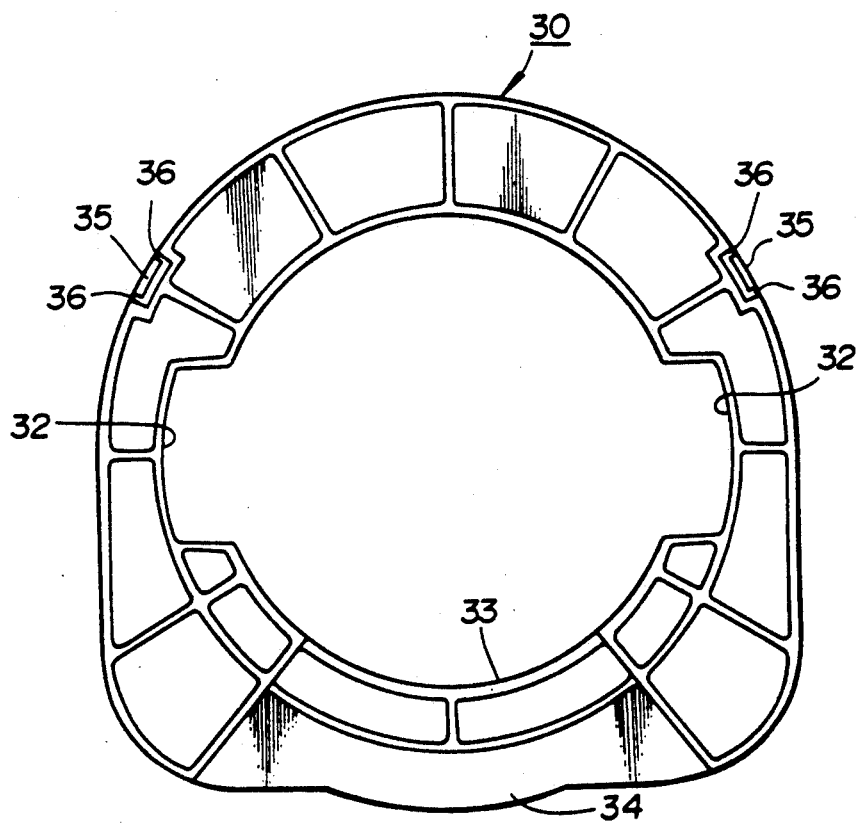
FIG. 2 is a bottom plan view of the disk adapter shown in FIG. 1.

The disk adapter 30 for the disk cartridge according to the present invention is contoured as shown in FIGS. 1 and 2. This disk adapter 30 is molded from a synthetic resin material exhibiting predetermined rigidity as a plate-like member of a such a size that the adapter 30 fits with the disk rest 15 of the disk cartridge 11 and of such a thickness that the upper surface of the adapter is flush with the major surface 12a of the main body 12. With the present embodiment, the portion of the disk adapter 30 opposite to the rear wall section of the main body 12 has the shape of a disk.

The disk adapter 30 is formed with a circular opening 31 at approximately the center thereof which is of a slightly larger diameter than the diameter of a disk-shaped recording medium, referred to hereinafter as the disk $D_1$. Thus the opening 31 is sized to permit rotation of the disk $D_1$ therein, and the arrangement is so made that, when the adapter 30 is fitted to the disk rest 15 of the main body 12, the center of the circular opening 31 lies on a straight line interconnecting the center of the circular opening section 16a of the window opening 16 with the center of the chucking plate 23.

Figure 3:
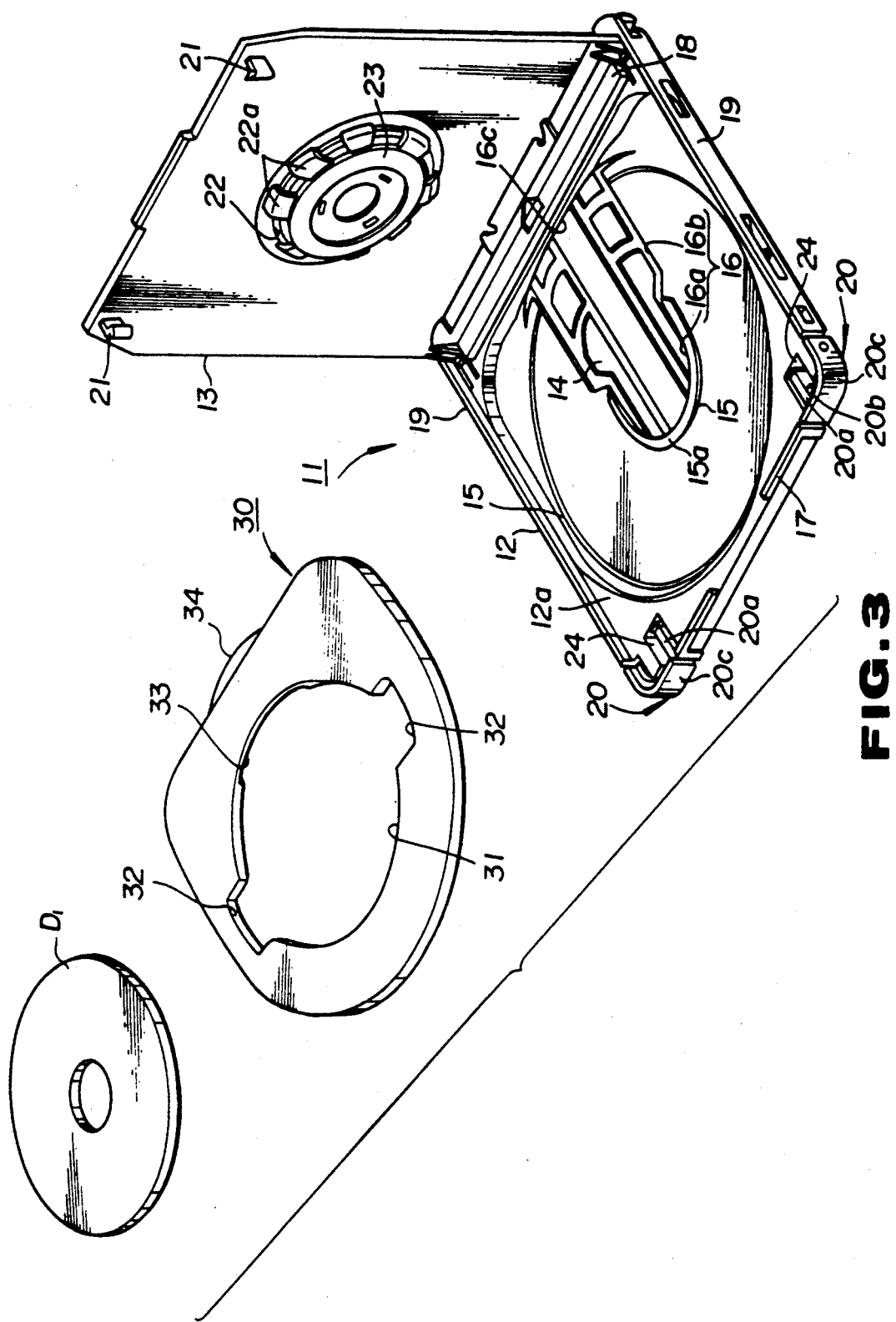
Figure 4:
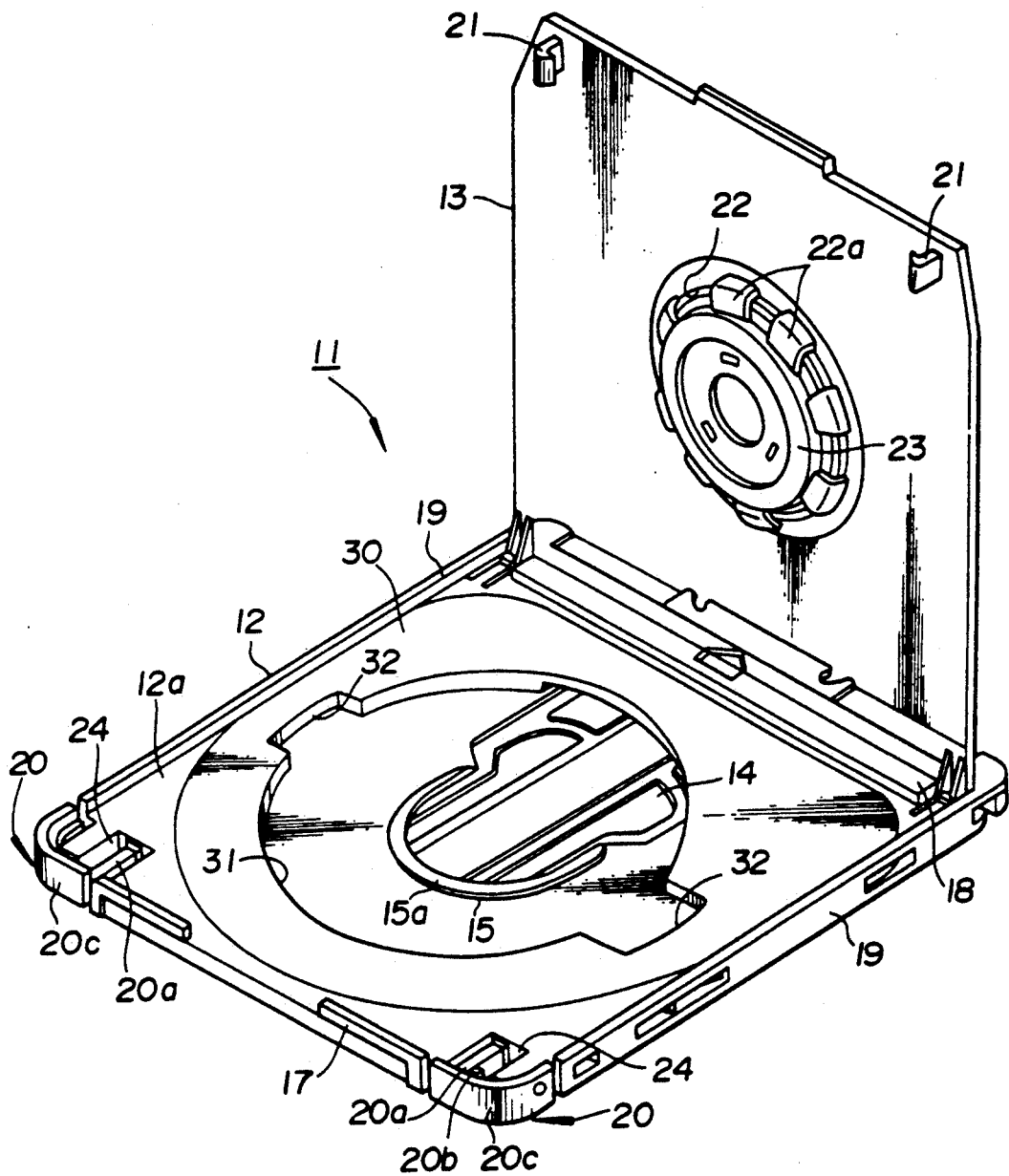
Figure 5:
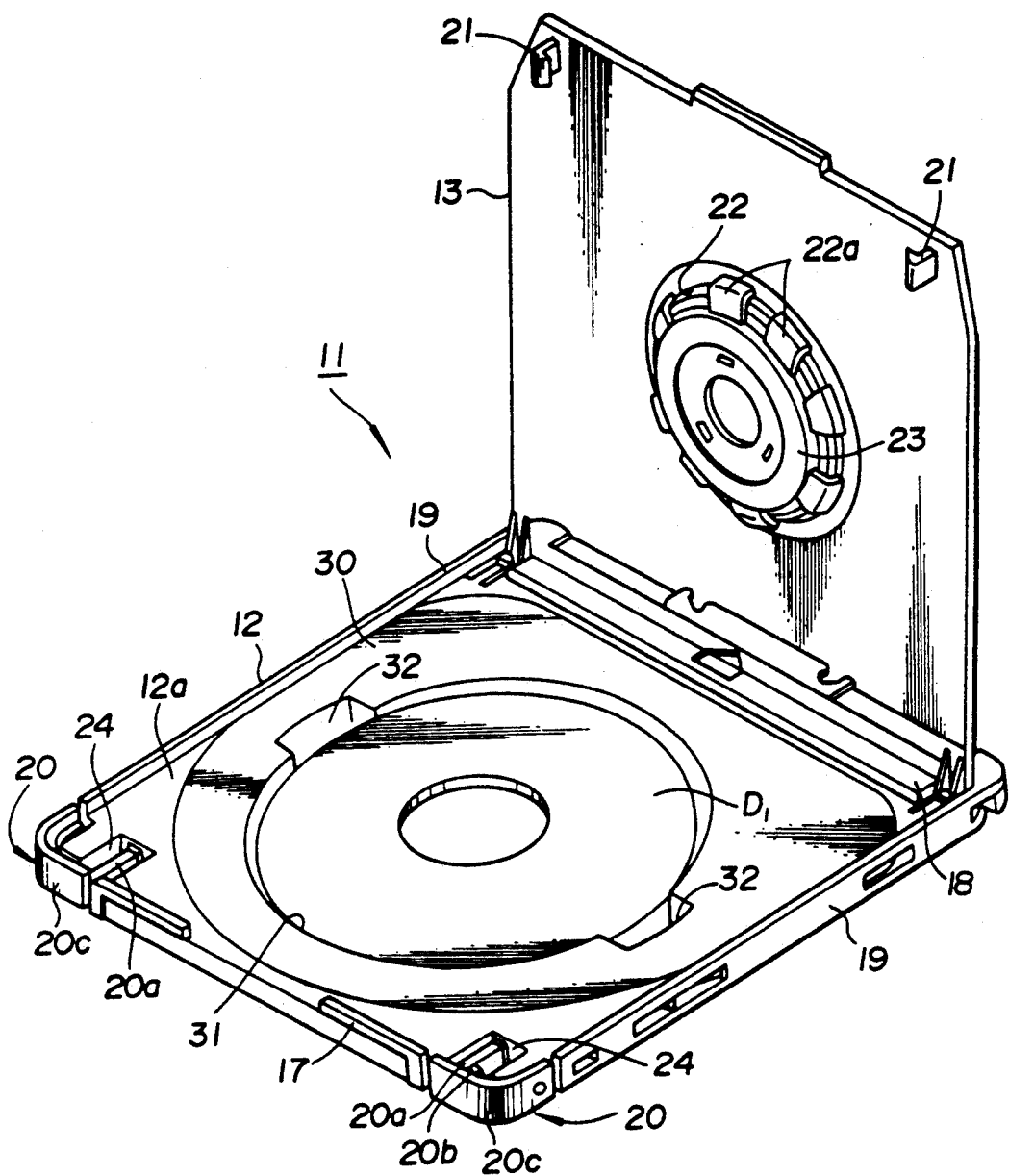

The opening 31 of the adapter 30 is formed with two confronting recesses 32, 32. As shown in FIGS. 3 to 5, the function of these recesses 32, 32 is to facilitate detachment of the disk $D_1$ housed in the opening 31 when the adapter 30 is fitted within the main casing body 12. Only one recess 32 suffices if the disk $D_1$ can be detached easily.

The rear side wall of the opening 31 of the adapter 30 is formed with a step 33 along the thickness of the adapter 30. This step 33 is formed in the direction of the bottom surface of the adapter along the trajectory of the recording and/or reproducing head provided in the recording and/or reproducing apparatus when the disk cartridge 11 is mounted in the recording and/or reproducing apparatus. The function of the step 33 is to prevent the recording and/or reproducing head from colliding against the adapter 30 when the adapter 30 is attached on the disk cartridge 11 and the latter is then attached with the adapter 30 attached thereto in the recording and/or reproducing apparatus.

The rear end of the adapter 30 is formed with a lug 34 projecting outward from the outer periphery of the adapter 30. This lug 34 is engaged in a recess 16c formed in the rear peripheral wall 18 of the casing main body 12 opposite to the window opening 16 for positioning the adapter 30 within the disk rest 15.

The outer forward periphery of the adapter 30 is formed with two retention tongues 35, 35 functioning to prevent the adapter 30 from being extricated from the disk rest 15 of the adapter 30. Each of the retention tongues 35, 35 is molded integrally with the adapter 30 and formed between recesses 36, 36 with the forward end side projecting slightly from the outer periphery of the adapter 30. The tongue 35 exhibits resiliency in a direction normal to these recesses 36, 36. Thus the retention tongues 35, 35 are adapted to thrust and thereby retain the side wall of the disk rest 15 when the adapter 30 is housed on the disk rest 15 of the disk cartridge 11. These retention tongues may be dispensed with if the adapter 30 may be sufficiently prevented from being extricated from the disk rest 15 by operation of the lug 34.

Figure 6:
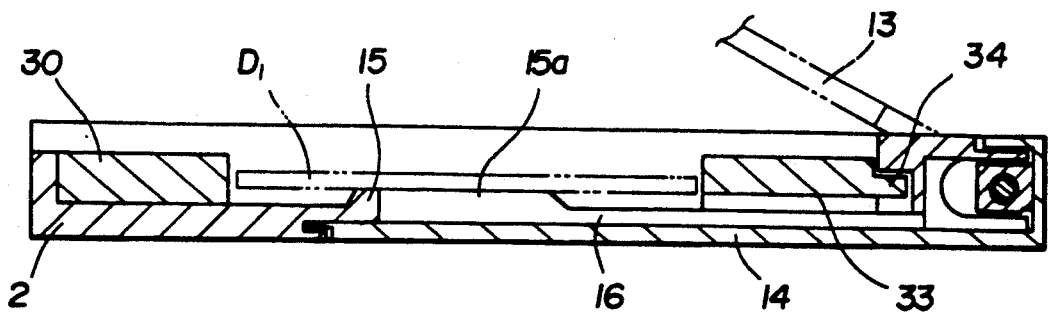

The above described disk adapter 30 for the disk cartridge according to the present invention is used when fitted on the disk rest 15 of the disk cartridge 11, as shown in FIGS. 5 and 6.

That is to say, when the disk adapter 30 is fitted on the disk rest 15 of the disk cartridge 11, the lug 34 of the adapter 30 is engaged with the recess 16c formed in the rear peripheral wall 18 of the casing main body 12, as shown in FIG. 6, for positioning the adapter 30 on the disk rest 15, while the retention tongues 35, 35 prevent the disk adapter 30 from being extricated from the disk rest 15.

In this state, disk $D_1$ is placed within the opening 31 of the adapter 30 and the lid 13 is levelled for closure. At this time, the hooks 21, 21 are engaged with the locking tongues 20b, 20b of the arm sections 20a, 20a for locking the lid 13 with respect to the casing main body 12 for closing the upper surface of the disk cartridge 11. The disk $D_1$ may be rotatably accommodated in a housing enclosure thus defined within the disk cartridge 11.

With the upper surface of the main casing body 12 closed by the lid 13, the disk cartridge 11 is attached in position within the recording and/or reproducing apparatus. The disk $D_1$ is positioned at this time by the opening 31 of the adapter 30 so that it may be chucked correctly by the chucking plate 23 and by the disk table within the recording and/or reproducing apparatus.

In this manner, the recording and/or reproducing operation may be performed correctly on disks $D_1$ of different diameters accommodated within the disk cartridge 11.

The disk adapter according to the present invention enables the disk-shaped recording medium, such as an optical disk, to be accommodated within a central opening thereof to enable the disk-shaped recording medium to be accommodated within the disk cartridge with correct positioning.

Hence, with the use of the above described disk adapter, even when a disk having a diameter different from the diameter of the usually employed disk is accommodated in the disk cartridge, the recording and/or reproducing operation may be performed with accurate centering of the different diameter disk with the aid of the same disk cartridge.

Therefore, with the use of the above mentioned disk adapter, the universality of the disk cartridge may be improved positively.

What is claimed is:

1. A disk adaptor for a disk cartridge comprising a rigid plate-like member, wherein said rigid plate-like member includes:
   an opening at approximately the center thereof for rotatably accommodating a disk-shaped recording medium therein;
   a plurality of recesses adjacent to and communicating with said opening for use in removing the disk-shaped recording medium from said adapter;
   said plate-like member having one end substantially rounded and the other end having at least two corner projections integrally formed with said plate-like member for positioning and retaining the disk adapter in a disk housing section of the disk cartridge by placing said corner projections into complementary corner recesses formed as part of the disk housing section; and
   at least one locating lug protruding from the outer periphery of the adapter proximate said two corner projections for engaging a complimentary slot formed in the disk housing section of the disk cartridge for locating the adapter upon placement into the disk cartridge.

2. The disk adapter according to claim 1 wherein the disk adapter has a size to fit in the disk housing section of the disk cartridge and a thickness approximately equal to the height of the disk housing section of the disk cartridge.

3. The disk adapter according to claim 2, wherein the disk cartridge includes a centrally arranged window and said disk adapter further comprises
   a step formed on the disk adapter as an area of reduced thickness for alignment along the window of the disk cartridge such that a clearance is provided adjacent the window.

4. A disk adapter for a disk cartridge comprising a rigid plate-like member having a front end facing a reproducing/recording head and a rear end opposite from the front end, wherein said rigid plate-like member includes:
   an opening at approximately the center thereof for rotatably accommodating a disk-shaped recording medium therein;
   two recesses adjacent to and communicating with said opening located on opposite sides midway between the front and rear ends of said adapter for use in removing the disk-shaped recording medium from said adapter;
   said plate-like member having the rear end substantially rounded and the front end having at least two corner projections integrally formed on the front end of said plate-like member for positioning and retaining the disk adapter in a disk housing section of the disk cartridge by placing said corner projections into complementary corner recesses formed as part of the disk housing section; and
   at least one locating lug protruding from the front end of the adapter proximate said two corner projections for engaging a complementary slot formed in the disk housing section of the disk cartridge for locating the adapter upon placement into the disk cartridge.

* * * * *